United States Patent [19]

Luedtke

[11] 4,318,106

[45] Mar. 2, 1982

[54] DIRECTION FINDING SYSTEM

[75] Inventor: Arthur Luedtke, Marietta, Ga.

[73] Assignee: The United States of America as represented by the Field Operations Bureau of the FCC, Washington, D.C.

[21] Appl. No.: 132,027

[22] Filed: Mar. 20, 1980

[51] Int. Cl.³ .............................................. G01S 5/04
[52] U.S. Cl. .................................................. 343/124
[58] Field of Search ........................................ 343/124

[56] References Cited

U.S. PATENT DOCUMENTS

| 3,546,698 | 12/1970 | Kaltschmidt | 343/124 X |
| 3,701,155 | 10/1972 | Adams | 343/124 X |
| 4,129,874 | 12/1978 | Luedtke et al. | 343/854 |

FOREIGN PATENT DOCUMENTS 1237361  6/1971  United Kingdom ................ 343/124

Primary Examiner—Malcolm F. Hubler
Attorney, Agent, or Firm—Wm. Ferrel Bentley

[57] ABSTRACT

A variable aperture direction finding system which uses a circular array of vertical receiving antennas connected to a capacitive type goniometer located in the center of the array to receive signals from radio frequency transmission sources. The goniometer has a stator plate for each antenna and a number of rotor plates which allow for the provision of selecting suitable apertures and antenna combinations to form Lobe or Split-lobe directional patterns. The goniometer's rotation is controlled by a servo drive system which provides for both manual positioning as well as automatic operation from a remote control unit.

The system utilizes a remote control panel to allow selection of either manual or automatic rotation, azimuth indication, aperture and pattern selection, and manual positioning of the goniometer.

An azimuth indicator system is driven in synchronization with the goniometer. The bidirectional bearing of the incoming signal may be determined using the manual/aural method, or visually using the automatic mode and the visual indicator unit.

A visual indicator unit, also driven in synchronization with the goniometer, displays a visual representation of the strength of the received signal relative to the instantaneous azimuth. The receiver audio is converted to a voltage and displayed vs the azimuth on a long-persistence CRT which has a deflection yoke rotating synchronously with the goniometer. The audio voltage may also be fed to a capacitive integrator drum rotating at two times the goniometer speed to average both nulls of the received signal to minimize pattern shift and site errors while also serving as a memory storage for short duration signals. The visual unit has provision for display of Lobe, Split-lobe, and Null-lobe patterns.

15 Claims, 10 Drawing Figures

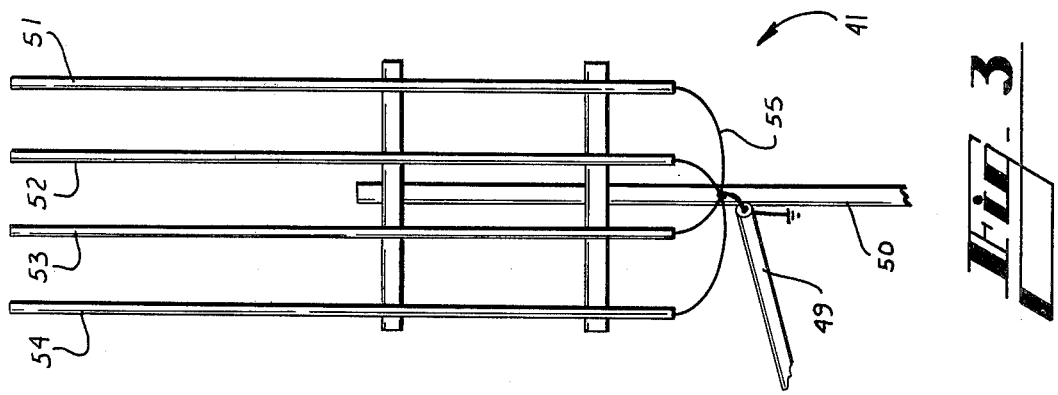
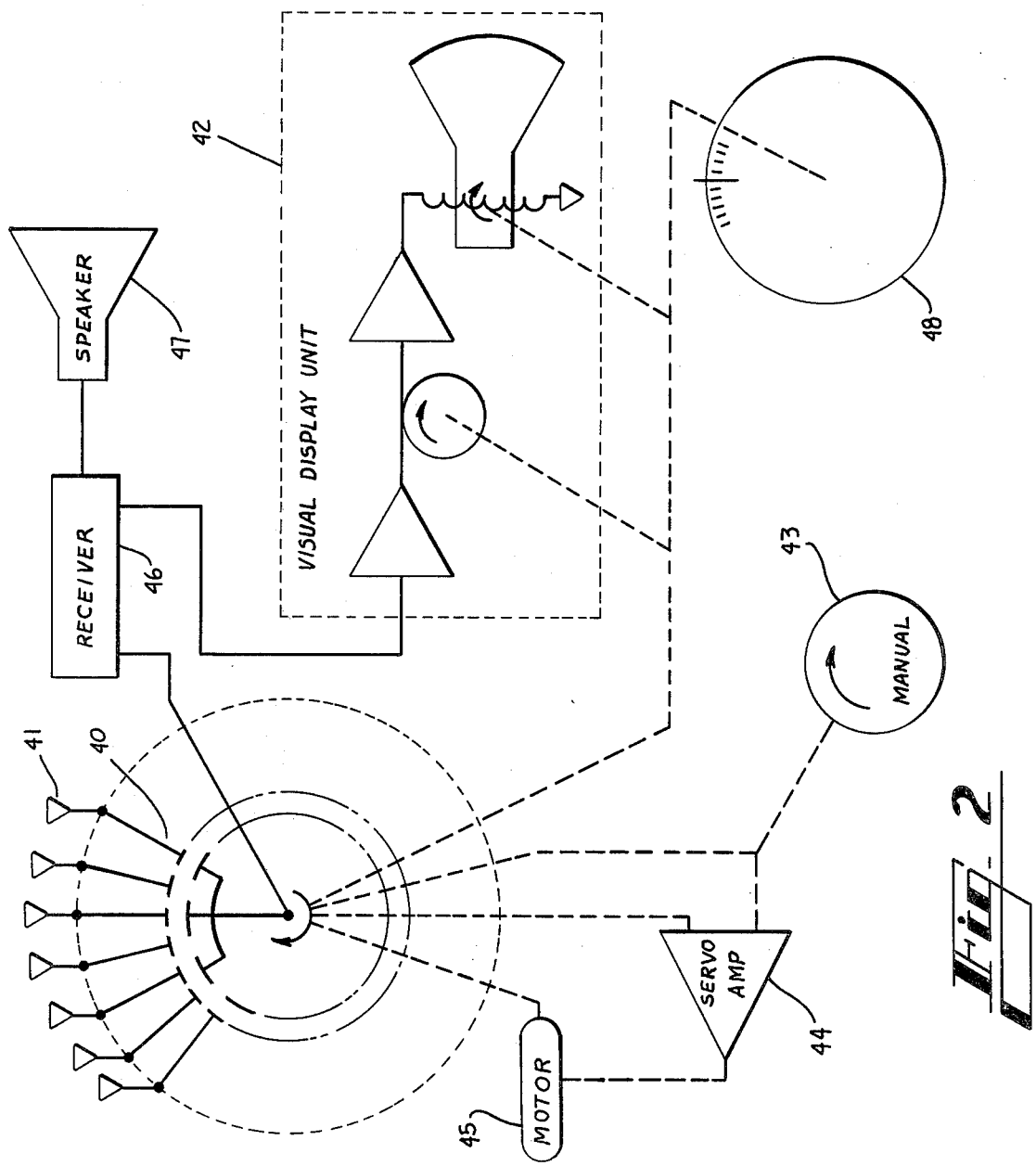

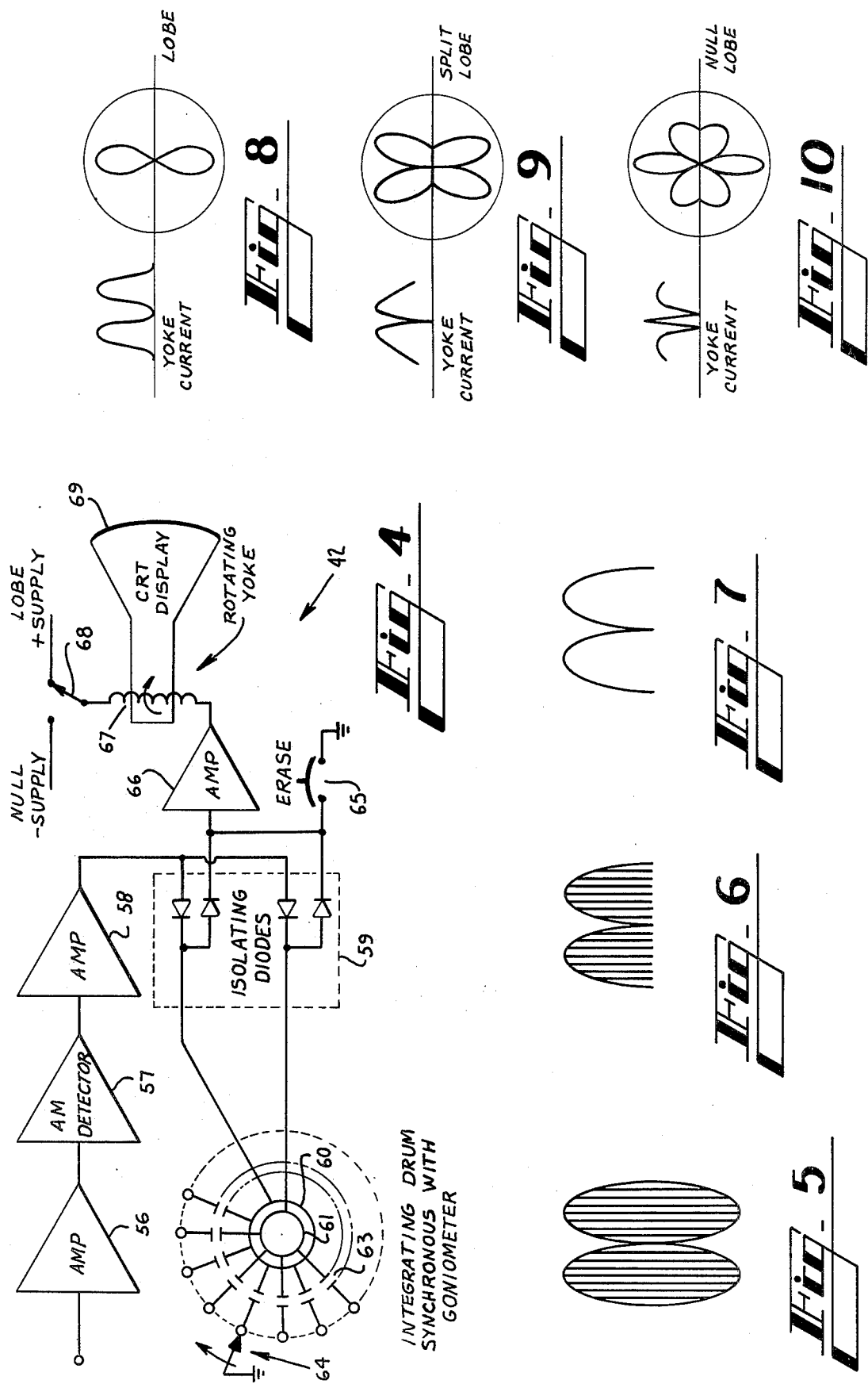

DIRECTION FINDING SYSTEM

BACKGROUND OF THE INVENTION

1. Field of the Invention

The present invention relates to improvements in long range fixed site wide aperture direction finding systems, and more particularly pertains to systems with circular arrays of receiving antennas. These arrays usually consist of two rings of antennas with reflector screens which provide a single ended pattern. A wide aperture direction finder (WADF) is one in which the arriving wavefront is sampled simultaneously by an array of antennas extending over a distance of one wavelength or greater, as opposed to an Adcock type which has apertures of a few tenths of a wavelength.

2. Prior Art

In the field of WADF's it has been the general practice to use narrow lobes and high rotation rates. This puts severe limitations on the receiving system and the bandpass of the IF and detecting circuitry, and in some cases even requires a dual receiving system. The antennas are usually fed through delay lines to the combiner networks to simulate a broadside pickup pattern with a portion of the circular array. A goniometer spinning at a constant rate couples the antenna signal to a coaxial feed to the receiving system. The most common, Wullenweber WADF's employ circular rings of identical elements requiring huge reflector screens. These circular ring arrays are quite costly to construct and maintain while achieving satisfactory radiation patterns over only about 3:1 or 4:1 frequency range. In most cases at least two ring arrays are required to give even the most minimal coverage over the 15:1 frequency range from 2 to 30 MHz. Ionospheric disturbances such as multipath propagation characteristically generate substantial bearing errors in the HF spectrum which are difficult to resolve with conventional single lobe methods.

SUMMARY OF THE INVENTION

It is the object of this invention to provide a high frequency direction finding system that has all the advantages of similarly employed direction finding systems while at the same time minimizing or eliminating the above described disadvantages. To attain this, the present invention utilizes a unique variable aperture direction finding system which allows for manual operation as well as automatic operation. Furthermore, this invention applies the principles of the Adcock type DF to a Wide Aperture type array by always selecting the pick up points to be less than a wavelength apart while applying the Wide Aperture principle of taking samples over more than one wavelength.

An object of the present invention is the provision of a DF system having a usable frequency coverage from 400 kilohertz to 40 megahertz utilizing only a single ring array of antennas. Another object is to provide switching arrangements for a goniometer connected to the antenna array for selecting antenna patterns forming Lobe or Split-lobe directional patterns. A further object of the invention is the provision of a servo drive system for the goniometer which can be controlled remotely for both manual and automatic modes of rotation. Manual positioning of the goniometer is used for taking manual/aural type bearings and automatic rotation is used in conjunction with a visual display unit.

When a manual bearing is desired, the goniometer is manually swung back and forth slowly while listening to the audio for the null; the bearing can then be read directly from the azimuth scale. This manual mode allows extremely narrow IF bandwidths to be used giving more receiver sensitivity and signal selectivity. The manual mode also allows an accurate bearing to be taken on a signal in the presence of several stronger signals. Still another object is to provide a visual display unit which displays a signal as received by the goniometer or an enhanced by the synchronous integrator filter in the automatic mode of operation. Another object is to broaden the bandwidth of the antenna system so that one array can cover a wider frequency range than two arrays using the conventional reflector screens. Another object is to use a unique summing system which allows a reduction in aperture with increasing frequency to eliminate the need for delay lines in the system. Another object is to uniquely sum the forward and reciprocal patterns to reduce error caused by the site disturbances. Another object is to provide diversity reception of forward and reciprocal patterns which when summed result in reduction of errors due to propagation.

BRIEF DESCRIPTION OF THE DRAWINGS

The invention will be readily understood in light of the description of the embodiment of the present invention which follows. In the drawings which form part of the disclosure, like reference numerals refer to like elements.

FIG. 2 illustrates the complete block diagram of the DF system.

FIG. 3 illustrates an individual antenna.

FIG. 4 illustrates the block diagram of the visual display unit.

FIG. 5 illustrates the waveform of the signal input from the receiver.

FIG. 6 illustrates the detected voltage waveform.

FIG. 7 illustrates the voltage wave form stored on the drum.

FIG. 8 illustrates the display yoke current for Lobe pattern.

FIG. 9 illustrates the display yoke current for Split-lobe pattern.

FIG. 10 illustrates the display yoke current for Null-lobe pattern.

DESCRIPTION OF THE PREFERRED EMBODIMENTS

Figure 1:
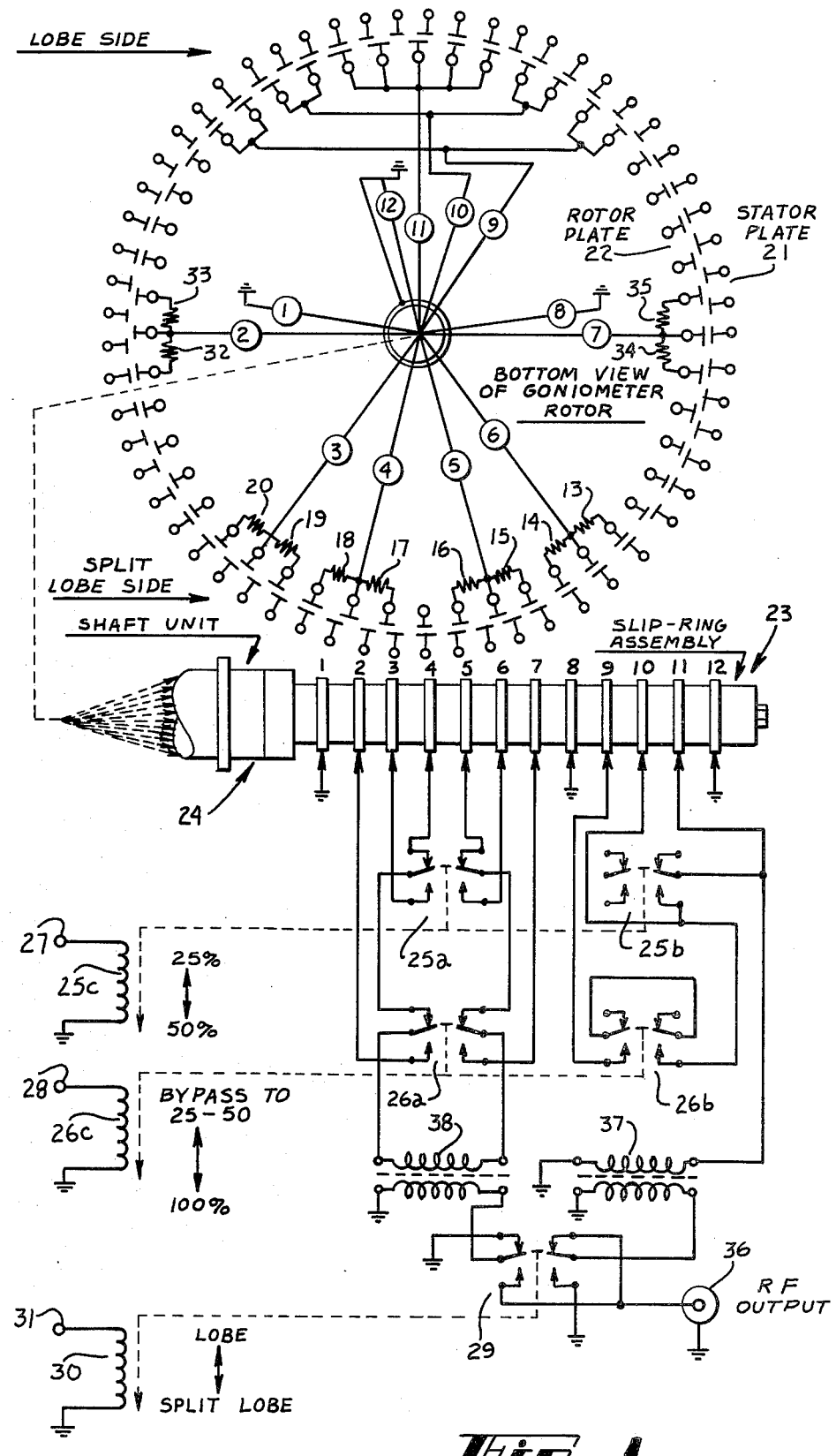
FIG. 1 illustrates the schematic of the goniometer and slip ring assembly.

FIG. 1 illustrates a preferred embodiment of the goniometer 40 with slip ring assembly 23. The slip ring assembly 23 which is mounted on the shaft 24, houses silver rings 1 through 12 which are connected to the corresponding lines on the goniometer 40.

Resistor sets 13,14; 15,16; 17,18; 19,20; 32,33; 34,35 connect the adjacent rotor plates 22 on both sides of the main rotor plate 22 for each line; they sum the signal so as to make a uniform phase change adding to the main signal at a reduced amount. The grounds are carried on the slip ring assembly 23 at the ends and in between Lobe and Split-lobe to keep the signals balanced and isolated. The relay which selects 25% or 50% aperture is controlled by a voltage at terminal 27 with current through coil 25c. The relay contacts 25a control the Split-lobe portion while contacts 25b control the Lobe portion. The relay which selects 100% or by-pass is controlled by a voltage at terminal 28 with current through coil 26c. The relay contacts 26a control the Split-lobe portion while 26b control the Lobe Portion. The relay which selects Lobe or Split-lobe is controlled by a voltage at terminal 31 with current through coil 30. The relay contacts 29 transfer the signal of Split-lobe difference transformer 38 or Lobe summing transformer 37 to RF output 36.

In the failsafe mode (no power applied) the system is in the Lobe mode and the RF output is connected through slip ring 11 to the center five rotor plates 22. This 25% aperture will produce a Lobe pattern when the five rotor plates 22 are broadside to the wavefront. The number of plates is increased to nine for 50% aperture and thirteen for 100% by closing the appropriate relay contacts.

In the Lobe pattern, 25% aperture, five goniometer rotor plates are paralleled to feed the receiver. Each rotor plate covers approximately 7½ degrees of the circle, meaning that approximately 37½ degrees of the full circle of antennas are paralleled to form this pattern. These antennas are connected to the wideband transformer 37 which is used to step the impedance up to match that of the receiver. As the aperture is increased to 50% another four plates are added and then four more are added for 100% making a total of 97½ degrees of antennas. The Split-lobe pattern is obtained by combining symmetrical sets of antennas and taking the difference signal from the balanced transformer 38. A signal null is produced when the phase and amplitude of the signals picked up by each set of antennas is equal. Each segment of antennas in the Split-lobe mode is selected by three rotor plates, two of which are coupled through precision one hundred ohm resistors to reduce their contribution somewhat at higher frequencies where the antenna impedance is low. In 25% aperture, the antenna pairs are separated 30 degrees in azimuth, in 50% by 75 degrees, and in 100% the antennas are separated a full 180 degrees or 450 feet.

As the aperture is increased, the Luedtke DF is scanning more antennas simultaneously which are separated further and further apart. This not only compensates for the wavelength, which increases with decreasing frequency, but also helps to match the antenna impedance to the line since a single antenna's impedance rises as the wavelength of the signal is increased. This particular embodiment has 60 antennas in a 450 foot circle. The number of antennas is selected such that the distance between adjacent antennas at the highest frequency of interest will not exceed one wavelength; if the size of the array is increased, the number of antennas will need to increase also for the same upper frequency limit.

Because of the wide frequency coverage of the Luedtke DF, it is not restricted to a single mode of operation. At lower frequencies, the direction finder produces patterns typical of a wide base Adcock, and indeed it is less than a wavelength across. As the frequency increases, the DF makes a transition into Wullenweber type operation with Lobe forming capabilities.

In general, all preliminary bearings are taken in 25% aperture since this produces the simplest pattern with the least ambiguity. The wider apertures are used to refine the bearing consistent with frequency limitations. Most preliminary bearings are taken using the visual integrator; after a bearing has been obtained, a manual/aural bearing is taken to determine the quality of the bearing by noting such factors as null depth, fading, bearing shift, etc. Under good skywave conditions a manual/aural bearing will be more accurate than a visual bearing. However, in the instance of multipath propagation, the visual integrator does an outstanding job of averaging the effects of pattern shift to yield the more accurate bearings. When it is necessary to take a bearing by the manual/aural method without preliminary use of the visual unit, the best procedure is to find the signal maximum in the Lobe position and then switch to Split-lobe to find the associated signal minimum.

Basically, the Luedtke DF forms only two different patterns, Lobe and Split-lobe. Slip rings 2 through 7 are connected to the rotor plates which form the three apertures of the Split-lobe patterns and rings 9 through 11 are used to form the three apertures of the Lobe pattern. An additional Null-lobe pattern is derived by inverting the recovered envelope of the Split-lobe pattern in the visual display unit 42. Thus, the pattern reaching the receiver is the same for Null-lobe as for Split-lobe, the difference being that the signal drives the CRT spot from the center toward the edge in Split-lobe and from the edge toward the center in Null-lobe. Although only a few typical patterns are shown, the display is capable of forming a very complex set of patterns over the useful frequency range of the system.

WADF's are based on derivation of the low frequency amplitude modulation impressed on a signal by the rotating antenna pattern. Since the modulation contains the direction information, the receiver configuration must be chosen so as to minimize any effects on the received signal. In particular, the width of the receiver passband, if too narrow, can cause dramatic shifts in the indicated bearing. The various bandpass filters cause phase delay as well as attenuation of the sidebands both of which significantly increase bearing error. By algebraic manipulation of formulas given by Keen in his book *Wireless Direction Finding*, Fourth Edition, 1947, the required receiver bandwidth can be shown to be equal to the goniometer RPM divided by 30 times the tangent of the allowable bearing error, i.e.

$$BW = \frac{RPM}{30 (\tan \phi)}$$

where $\phi$ = error

It can easily be seen that faster rotation rates or smaller allowable errors both require wider bandwidths. Assuming a one tenth degree allowable error, a typical WADF rotating at 650 RPM requires a minimum receiver passband of 12.4 KHz whereas the Luedtke DF rotating at 72 RPM requires only 1.4 KHz, almost a ten to one improvement in selectivity. The wider bandwidth also usually allows more than one signal in the passband at once, leading to confusion as to which set of patterns on the display represent the one of interest. Efforts to resolve this ambiguity usually lead to a dual receiver which requires the operator to tune in the desired signal using a narrower bandwidth and visually interpolate the display. Closely spaced signals can usually be resolved directly using the narrower bandwidths associated with the Luedtke DF; however, if inferference is still a problem, the manual mode can be selected and the receiver bandwidth narrowed to 100 Hertz or less as the goniometer is manually moved slowly through the null. Using the manual/aural method, the receiver bandpass has no effect on the indicated bearing.

FIG. 2 illustrates a preferred embodiment of the complete Luedtke DF. The manual control knob 43 connects to the goniometer 40 and the servo amp 40. As the control knob 43 is rotated, the servo looks at the relative difference between the knob and the goniometer rotor and produces a voltage which directs the motor 45 to position the rotor so that it stays synchronized with the manual control knob. The visual display unit 42 and the manual readout scale 48 are also connected to and synchronous with the goniometer. The RF output from the goniometer is fed to the receiver 46 which in turn produces an audio output that drives the speaker 47 and the visual display unit 42.

FIG. 3 illustrates a preferred embodiment of the individual antennas 41. The elements 51, 52, 53, and 54 are thin metallic tubes mounted on a mast 50 made of insulating material. The four elements 51 through 54 are connected to the coaxial cable 49 by means of a harness 55. The signal is fed to the goniometer 40 by means of the cable 49.

FIG. 4 illustrates the preferred embodiment of the visual display unit. The input signal from the receiver shown in FIG. 5 is amplified through amplifier 56. The signal is then rectified in AM detector 57 and is shown in FIG. 6. It is then amplified again in amplifier 58 and fed to the steering and isolating diodes 59. The steering diodes 59 allow the signal to be viewed on the display while charging up the integrator drum 70. The drum commutator 71 charges 120 capacitors 63 with a voltage proportional to the strength of the pattern at the instant of brush 64 contact. Since the drum 70 rotates at twice the speed of the goniometer 40, the resultant charge pattern represents the signal pattern with forward and reverse patterns averaged together, significantly reducing conventional bearing error. The isolating diodes 59 and slip rings 60 and 61 enable alternate capacitors 63 to be simultaneously charged to different voltages without bleeding charge between adjacent capacitors. This method allows the commutator brush 64 to contact two capacitors at once eliminating the troublesome switching spikes inherent in previous designs. When a signal is sampled over a number of revolutions, the samples will be progressively stored in the capacitors 63 to produce a composite or average bearing. The integrator drum also serves as a memory device since the capacitors will retain the stored signal for several minutes. This is of particular value when dealing with intermittent or short duration signals.

The erase switch 65 will remove all charge from the drum, putting it in condition to store new information. FIG. 7 shows the voltage waveform stored on the drum for a typical Lobe signal. This is current amplified by amplifier 66 to drive the rotating yoke 67 which moves the cursor around the CRT display 69 synchronous with the goniometer rotation. By changing the direction of current flow with switch 68, the pattern of the CRT 69 can be inverted. FIG. 8 shows a graph of yoke current as well as the display for a basic Lobe pattern. FIG. 9 shows a graph yoke current and the display for a Split-lobe pattern; FIG. 10 shows a graph of the inverted yoke current and the resultant display for the Null-lobe mode. The Null-lobe display is the inverse of the Split-lobe display and is desirable because it places the null of the pattern closer to the outside edge of the CRT for maximum accuracy.

Typical good skywave signal path stability is plus or minus one degree due to ionospheric changes in path length, changes in polarization, and variation of absorption. When installed on a good site, the Luedtke Direction Finder can determine the azimuth of arrival of a signal to an accuracy of one tenth degree. Further, under bad signal conditions when fade and shift are extreme, and where bearing variations of several degrees may be encountered, the Luedtke DF with its enhanced display can still determine the bearing to a high degree of accuracy when previous WADF's could get no bearing at all.

Various modifications are contemplated and may obviously be resorted to by those skilled in the art without departing from the spirit and scope of this invention as herein defined by the appended claims, as only a preferred embodiment hereof has been disclosed.

I claim:

1. An automatic variable aperture direction finder comprising:
    a wideband circularly disposed array of antennas connected to a goniometer;
    said antennas operated without a reflector screen providing multi-octave frequency coverage and diversity reception capability;
    means for phase comparison of selected antennas to produce Lobe and Split-lobe patterns without the use of delay lines;
    means for varying the effective aperture of said antenna array through selection of rotor plate signals;
    means for receiving, detecting, and displaying said signal pattern;
    means for displaying the signal patterns in bearing form;
    and means for controlling said goniometer.

2. The direction finder according to claim 1 and in which the means for displaying the patterns has provisions for inverting the Split-lobe signal to produce a Null-lobe pattern.

3. The direction finder according to claim 1 and in which the means for displaying the pattern has provisions for signal enhancement, by averaging and storage of the signal; this includes provision for folding pattern over on itself to average forward and reciprocal bearings.

4. The direction finder according to claim 1 and in which the Lobe function consists of summing an odd number of rotor plates using no delay lines and adding to those plates equally on both sides to increase the aperture in steps to approximately 100 degrees.

5. The direction finder according to claim 1 and in which the Split-lobe function consists of taking the difference of two matched sets of symmetrically oriented rotor plates without the use of delay lines; spacing between sets always being an odd number of plates with a single plate separation at the narrowest aperture, increasing in steps to 180 degree separation at the widest aperture.

6. A manual variable aperture direction finder comprising:
    a wideband circularly disposed array of antennas connected to a goniometer;
    said antennas operated without a reflector screen providing multi-octave frequency coverage and diversity reception capability;
    means for phase comparison of selected antennas to produce Lobe and Split-lobe patterns without the use of delay lines;
    means for varying the effective aperture of said antenna array through selection of rotor plate signals;

means for receiving, detecting, and displaying said signal patterns;

means for displaying said signal patterns in bearing form;

and means for controlling said goniometer.

7. The direction finder according to claim 6 and in which the Lobe function consists of summing an odd number of rotor plates using no delay lines and adding to those plates equally on both sides to increase the aperture in steps to approximately 100 degrees.

8. The direction finder according to claim 6 and in which the Split-lobe function consists of taking the difference of two matched sets of symmetrically oriented rotor plates, using no delay lines; spacing between sets always being an odd number of plates with a single plate separation at the narrowest aperture, increasing in steps to 180 degree separation at the widest aperture.

9. A dual mode variable aperture direction finding system comprising:

a wideband circularly disposed array of antennas connected to a goniometer;

said antennas operated without a reflector screen providing multi-octave frequency coverage and diversity reception capability;

means for selecting the mode of operation, either manual or automatic;

means for phase comparison of selected antennas to produce Lobe and Split-lobe patterns without the use of delay lines;

means for varying the effective aperture of said antenna array through selection of rotor plate signals;

means for receiving, detecting, and displaying said signal patterns;

means for displaying the signal patterns in bearing form;

and means for controlling said goniometer.

10. A direction finding system according to claim 9 and in which the means for displaying the patterns has provisions for inverting the Split-lobe signal to produce a Null-lobe display.

11. A direction finding system according to claim 9, and in which the means for displaying the pattern has provisions for pattern enhancement by averaging, and storage of the main signal as well as combining the forward and reciprocal patterns.

12. A direction finding system according to claim 9 and in which the manual mode of operation consists of combined visual and aural interpretation of the bearing while manually swinging the goniometer across the null.

13. A direction finding system according to claim 9, and in which the automatic mode of operation consists of continuous rotation of the goniometer with the visual display producing a steady pattern on the CRT display.

14. A direction finding system according to claim 9 and in which Lobe function consists of summing an odd number of rotor plates using no delay lines and adding to those plates equally on both sides to increase the aperture in steps to approximately 100 degrees.

15. A direction finding system according to claim 9 and in which the Split-lobe function consists of taking the difference of two matched sets of symmetrically oriented rotor plates, without the use of delay lines; spacing between sets always being an odd number of plates with a single plate separation at the narrowest apertures, increasing in steps to 180 degrees separation at the widest aperture.

* * * * *